United States Patent
Tsukamoto

(10) Patent No.: US 7,460,194 B2
(45) Date of Patent: Dec. 2, 2008

(54) FLAT DISPLAY DEVICE INCLUDING STRESS EASING FRAME BEZEL

(75) Inventor: Takayoshi Tsukamoto, Kodama-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 288 days.

(21) Appl. No.: 11/299,748

(22) Filed: Dec. 13, 2005

(65) Prior Publication Data
US 2006/0087804 A1   Apr. 27, 2006

Related U.S. Application Data

(63) Continuation of application No. PCT/JP2004/008571, filed on Jun. 11, 2004.

(30) Foreign Application Priority Data
Jun. 13, 2003 (JP) .............................. 2003-169914

(51) Int. Cl.
*G02F 1/1333* (2006.01)
(52) U.S. Cl. .......................................... 349/60; 349/58
(58) Field of Classification Search .............. 349/58–60
See application file for complete search history.

(56) References Cited

U.S. PATENT DOCUMENTS 5,583,681 A * 12/1996 Shioya et al. ................. 349/60
6,424,391 B1 * 7/2002 Tsukamoto et al. ........... 349/58
6,937,297 B2 * 8/2005 Kang et al. ................... 349/58
7,046,316 B2 * 5/2006 Lai .............................. 349/58
2004/0066473 A1 * 4/2004 Fukuwaki .................... 349/58

FOREIGN PATENT DOCUMENTS

| JP | 2-119623 | 9/1990 |
|---|---|---|
| JP | 4-9982 | 1/1992 |
| JP | 2000-214457 | 8/2000 |
| JP | 2001-216827 | 8/2001 |
| JP | 2001-222231 | 8/2001 |
| JP | 2001-337621 | 12/2001 |

* cited by examiner

*Primary Examiner*—Andrew Schechter
(74) *Attorney, Agent, or Firm*—Oblon, Spivak, McClelland, Maier & Neustadt, P.C.

(57) ABSTRACT

A flat display device includes a display panel, a frame which holds the display panel, and a frame-shaped bezel which is fixed to the frame and holds the display panel on the frame. The bezel has a surface portion, side face portion, reverse portion, fixed portion, and stress easing portion. The surface portion has an end side on the boundary with a display region of the display panel and covers a first main surface of the display panel with the display region exposed. The side face portion covers at least a part of a side face of the frame. The reverse portion extends covering at least a part of a reverse surface of the frame. The fixed portion is provided on the reverse portion and fixed to the frame. The stress easing portion is situated near a shortest path extending from the fixed portion of the bezel toward the end side and eases stress in a direction such that the surface portion and the display panel are separated from each other.

5 Claims, 7 Drawing Sheets

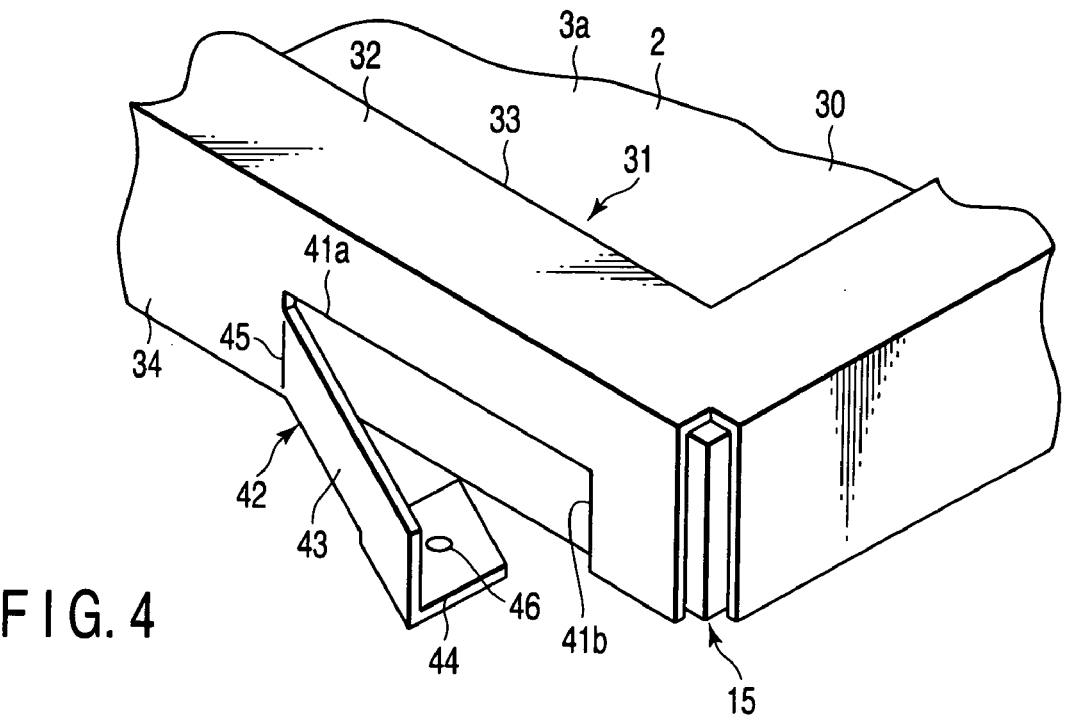
F I G. 4
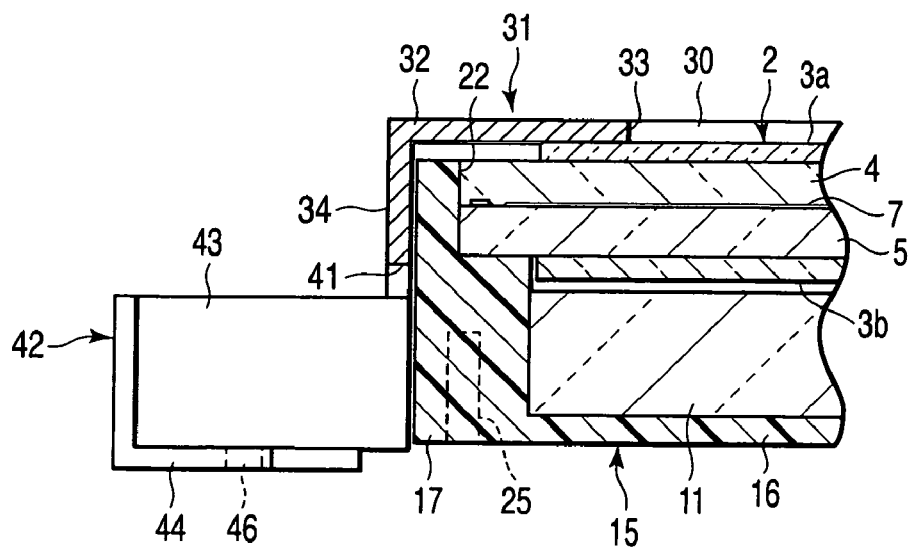
F I G. 5

FLAT DISPLAY DEVICE INCLUDING STRESS EASING FRAME BEZEL

CROSS-REFERENCE TO RELATED APPLICATIONS

This is a Continuation Application of PCT Application No. PCT/JP2004/008571, filed Jun. 11, 2004, which was published under PCT Article 21(2) in Japanese.

This application is based upon and claims the benefit of priority from prior Japanese Patent Application No. 2003-169914, filed Jun. 13, 2003, the entire contents of which are incorporated herein by reference.

BACKGROUND OF THE INVENTION

1. Field of the Invention

The present invention relates to a flat display device provided with a flat display panel having a display region for image display on one main surface side.

2. Description of the Related Art

In recent years, flat display devices represented by liquid crystal display devices have been used as various display devices of TV sets, computers, car navigation systems, etc., taking advantage of their features, such as thinness, lightness in weight, and low power consumption.

As is described in Jpn. Pat. Appln. KOKAI Publication No. 2001-337621, for example, a liquid crystal display device generally comprises a liquid crystal panel of a light transmissive type and a backlight in the form of a rectangular plate. The liquid crystal panel is formed of a pair of substrates and a liquid crystal layer held between them. The backlight is overlapped on one main surface, e.g., the reverse surface, of the liquid crystal panel. The other main surface or the obverse surface of the liquid crystal panel has an image display region. The liquid crystal panel and the backlight are placed on a resin frame in the form of a substantially rectangular frame. Further, a rectangular frame-shaped metallic bezel is mounted on the resin frame so as to cover the peripheral edge portion and the side faces of the obverse surface of the liquid crystal panel and the side faces of the resin frame. Thus, the liquid crystal panel and the backlight are held sandwiched between the resin frame and the bezel. A substantially rectangular display window through which the display region of the liquid crystal panel is exposed opens in the central portion of the bezel.

The bezel has a plurality of bendable portions that extend individually from the respective extreme ends of its side face portions, and a through hole for the passage of a screw is formed in each bendable portion. When the bezel is attached to the frame, each bendable portion is bent substantially in the shape of an L toward the reverse surface of the frame and faces the reverse surface of the frame. Further, each bendable portion is threadedly fixed to the reverse surface of the frame by the screw that is passed through the through hole. In consequence, the bezel is fixed to the frame.

With the flat display device constructed in this manner, however, the position and angle of bend of the bendable portion cannot be easily kept constant with high accuracy. If the position and angle of bend of the bendable portion are uneven, the stiffness of the bezel generates stress in a direction such that a part around the display window of the bezel lifts from the obverse surface of the liquid crystal display panel when the bendable portion is screwed to the frame. Accordingly, the part around the display window of the bezel lifts from the obverse surface of the liquid crystal panel, whereupon a gap is formed between the obverse surface of the liquid crystal panel and the bezel cover. In this case, light may possibly leak through this gap, thereby lowering the display quality of the display device.

BRIEF SUMMARY OF THE INVENTION

The present invention has been made in consideration of these circumstances, and its object is to provide a flat display device with improved display quality in which light leakage is prevented.

According to an aspect of the invention, there is provided a flat display device comprising: a flat display panel provided with a first main surface having a display region in which an image is displayed and a second main surface opposed to the first main surface; a frame which is located on the second main surface side of the flat display panel and holds the flat display panel; and a frame-shaped bezel fixed to the frame. The bezel includes a surface portion which has an end side on the boundary with the display region of the flat display panel and covers the first main surface of the flat display panel with the display region exposed, a side face portion which covers at least a part of a side face of the frame, a reverse portion which extends covering at least a part of a reverse surface of the frame, a fixed portion provided on the reverse portion of the bezel and fixed to the frame, and a stress easing portion which is situated near a shortest path extending from the fixed portion of the bezel toward the end side and eases stress in a direction such that the surface portion and the flat display panel are separated from each other.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a perspective view showing a part of the liquid crystal display device;

FIG. 5 is a cross-sectional view showing a part of the liquid crystal display device;

DETAILED DESCRIPTION OF THE INVENTION

A liquid crystal display device according to a first embodiment of this invention will now be described in detail with reference to the drawings.

Figure 1:
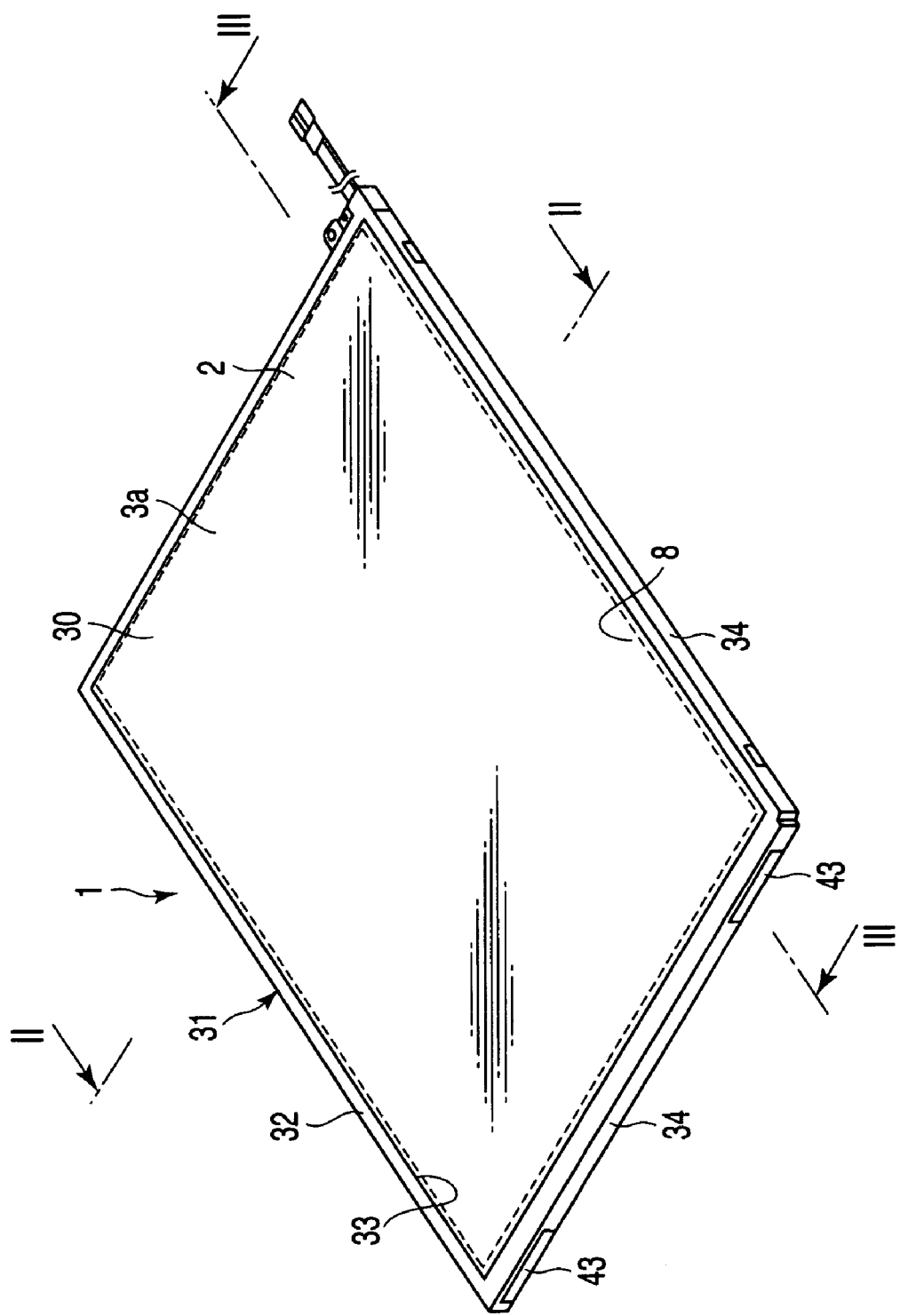
FIG. 1 is a perspective view showing a liquid crystal display device according to a first embodiment of this invention.
Figure 2:
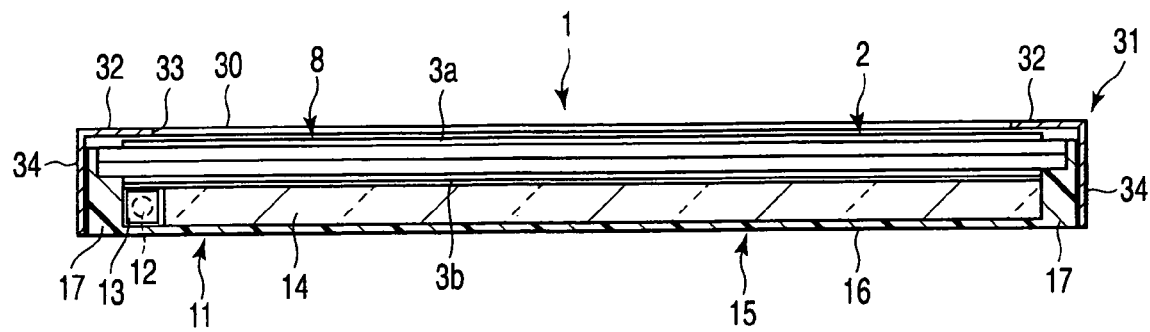
FIG. 2 is a sectional view taken along line II-II of FIG. 1.
Figure 3:
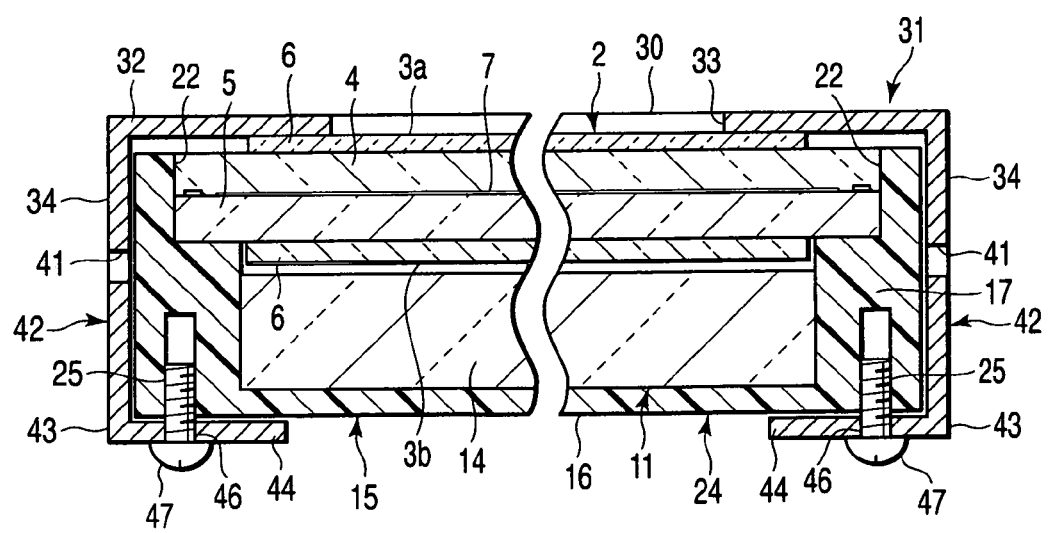
FIG. 3 is a sectional view taken along line III-III of FIG. 1.

As shown in FIGS. 1 to 3, a liquid crystal display device 1 comprises a liquid crystal panel 2 in the form of a substantially rectangular sheet that serves as a flat display panel. The liquid crystal panel 2 is transmissive or semi-transmissive. The liquid crystal panel 2 comprises a plurality of thin-film transistors (hereinafter referred to as TFTs), a rectangular array substrate 5 provided with pixel electrodes and the like, and a rectangular opposite substrate 4 opposed to the array board 5. The array substrate 5 and the opposite substrate 4 have their respective peripheral edge portions stuck together and are opposed to each other across a predetermined gap. A liquid crystal layer 7 that serves as a light modulating layer is sealed between the array substrate 5 and the opposite substrate 4. Optical sheets 6 are stuck individually to the outer surface of the array substrate 5 and the outer surface of the opposite substrate 4.

One surface of the liquid crystal panel 2, i.e., the outer surface of the opposite substrate 4 in this case, constitutes a first main surface 3a, while the other surface, i.e., the outer surface of the array substrate 5, constitutes a second main surface 3b. The first main surface 3a of the liquid crystal panel 2 has a rectangular display region 8 for image display in the whole central portion except its peripheral edge portion. The liquid crystal panel 2 displays a desired image in the display region 8 in response to drive signals, such as electrical signals or electrical energy, supplied from a circuit board such as a flexible printed board for liquid crystal.

A backlight 11 is located opposite to the second main surface 3b of the liquid crystal panel 2. The backlight 11 is provided with a plate-shaped light guide 14, an elongated cylindrical discharge lamp 12, and a reflective sheet 13. The light guide 14 is opposed to the second main surface 3b. The discharge lamp 12 is opposed to one side edge of the light guide and applies a linear light beam into the light guide. The reflective sheet 13 covers the outer periphery of a lateral portion of the discharge lamp.

The light guide 14 has a longitudinal dimension smaller than the longitudinal dimension of the liquid crystal panel 2 and a transverse dimension smaller than the transverse dimension of the liquid crystal panel 2. The light guide 14 is molded of a heat-resistant transparent resin, such as polycarbonate resin, acrylic resin, or cycloolefin polymer. A special prism (not shown) is formed on that surface of the light guide 14 opposite from the liquid crystal panel 2. A substantially rectangular optical sheet (not shown) is interposed between the light guide 14 and the liquid crystal panel 2.

The discharge lamp 12 for use as a linear light source is provided extending along a long side of the light guide 14. A light beam from the discharge lamp 12 enters the light guide 14 directly or after it is reflected by the reflective sheet 13. The linear incident light beam is converted into a planar light beam by a prism of the light guide 14 and applied to the whole surface of the liquid crystal panel 2. As this is done, the optical sheet diffuses or condenses the distribution of the planar light beam from the light guide 14 so that the light beam is incident substantially uniformly on the side of the second main surface of the liquid crystal panel 2. The planar light beam that is applied to the liquid crystal panel 2 is transmitted through the liquid crystal panel 2 and enters a user's eyes, whereupon an image displayed on a surface portion 3 of the liquid crystal panel 2 is viewed by the user.

The liquid crystal panel 2 and the backlight 11, which are modularized, are held on a frame 15 that is provided on the side of the second main surface 3b of the liquid crystal panel 2. The frame 15 is formed of resin and has the shape of a substantially rectangular bottomed frame. The liquid crystal panel 2 has its peripheral edge portion supported by the frame 15. The backlight 11 is supported on a bottom wall of the frame 15.

More specifically, as shown in FIGS. 2 and 3, the frame 15 integrally has a rectangular frame-shaped body 17 and a bottom wall 16 in the form of a substantially rectangular plate provided on the lower end side of the body. A step portion 22 is formed along the inner peripheral edge on the upper end side of the body 17. The light guide 14 of the backlight 11 is fitted inside the body 17 in a manner such that it is placed on the bottom wall 16 of the frame 15. The liquid crystal panel 2 is supported by the body 17 of the frame 15 with its peripheral edge portion in engagement with the step portion 22, and faces the light guide 14.

The frame 15, along with the backlight 11, constitutes a surface light source 24. On the bottom side of the frame 15, moreover, tapped holes 25 are formed individually near the four corners of the body.

A bezel 31 of electrically conductive metal is attached to the frame 15 that holds the backlight 11 and the liquid crystal panel 2. The bezel 31 integrally has a rectangular frame-shaped surface portion 32, a frame-shaped side face portion 34 that extends substantially at right angles from the outer peripheral edge of the surface portion, and a bottom portion (mentioned later) that extends from the side face portion 34 and faces the surface portion 32 in substantially parallel relation. The bezel 31 is attached to the frame 15 with its surface portion 32 covering the peripheral edge portion of the first main surface 3a of the liquid crystal panel 2 and with the side face portion 34 covering the respective side faces of the liquid crystal panel 2 and the frame 15.

A rectangular opening 30 is formed in the center of the surface portion 32. The opening 30 is defined by an end side 33 or the inner peripheral edge of the surface portion 32. The opening 30 has transverse and longitudinal dimensions smaller than the transverse and longitudinal dimensions, respectively, of the liquid crystal panel 2. The opening 30 has transverse and longitudinal dimensions equal to the transverse and longitudinal dimensions, respectively, of the light guide 14 of the backlight 11. In short, the opening 30 is formed having dimensions substantially equal to those of the liquid crystal panel 2 and the display region 8.

Thus, the surface portion 32 of the bezel 31 covers the peripheral edge portion of the first main surface 3a of the liquid crystal panel 2 in a manner such that the display region 8 is exposed through the opening 30. The end side 33 of the surface portion 32 is substantially coincident with the outline of the display region 8 and is situated on the boundary between the display region 8 and the surface portion 32. The width of the side face portion 34 is substantially equal to the width of the body 17 of the frame 15. Thus, the side face portion 34 covers the side face of the frame 15 that supports the backlight 11 and the liquid crystal panel 2.

On each short side of the bezel 31, as shown in FIG. 1 and FIGS. 3 to 7, bendable portions 42 are formed integrally on longitudinally opposite end portions of the side face portion 34, individually. Each bendable portion 42 is defined by notches or slits 41a and 41b that are formed in the side face portion 34. The slit 41a is formed in the central portion of the side face portion 34 with respect to the width direction and extends along the longitudinal direction of the side face portion. The slit 41b extends from one end of the slit 41a to the lower edge of the side face portion 34 and opens outward.

Thus, the bendable portion 42 has an elongated rectangular bendable portion body 43 that extends along the longitudinal direction of the side face portion 34. One end of the bendable portion body with respect to its longitudinal direction, that is, one end that is situated on the side opposite from the slit 41b, is coupled to the side face portion 34 and forms a hinge 45. The hinge 45 extends in the width direction of the side face portion 34, and the bendable portion body 43 is bendable around the hinge 45.

Further, the bendable portion 42 is provided integrally with a reverse portion 44 that extends from an end edge of the other end portion of the bendable portion body 43 toward the frame 15. The reverse portion 44 extends parallel to the surface portion 32 and is opposed to the reverse side of the frame 15. A through hole 46 that serves as a fixed portion is formed substantially in the center of the reverse portion 44. The through hole 46 is situated in alignment with its corresponding tapped hole 25 of the frame 15. The reverse portion 44 is threadedly fixed to the body 17 of the frame 15 with a screw 47 that is screwed into the tapped hole 25 of the frame 15 through the through hole 46.

Figure 6:
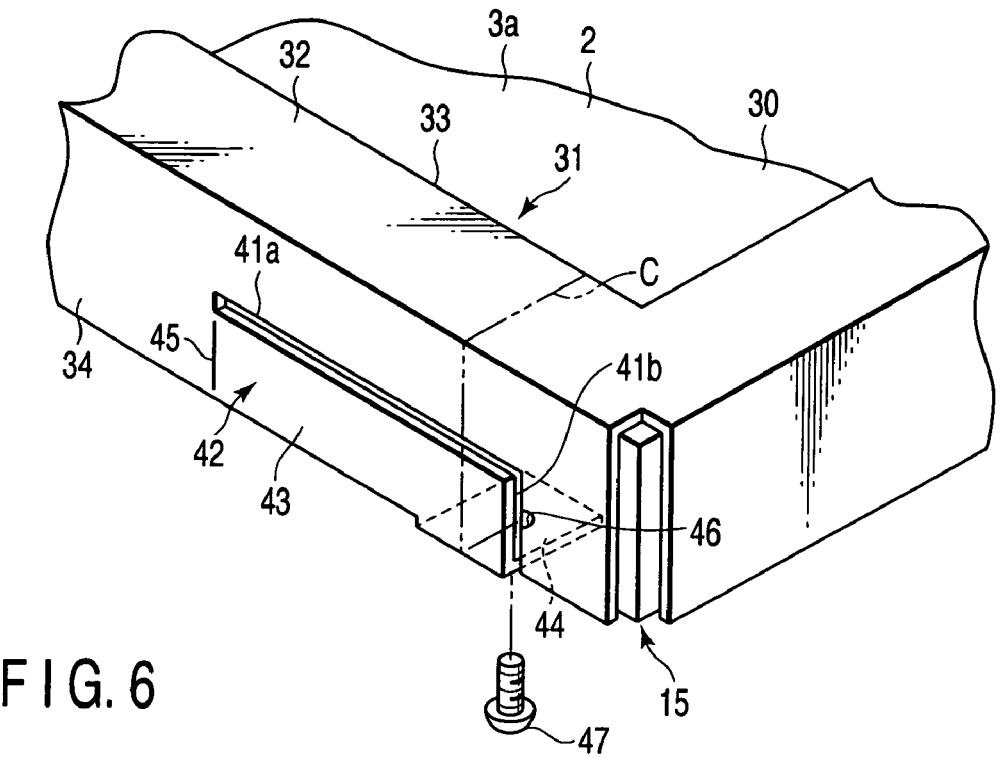
FIG. 6 is a perspective view showing a part of the liquid crystal display device.

If the shortest path that extends along the outer surface of the bezel 31 from the through hole 46 as the fixed portion to the end side 33 of the bezel 31 is C, as shown in FIG. 6, the slit 41a is situated near the shortest path C. In the present embodiment, the slit 41a extends across the shortest path C. The slit 41a functions as a stress easing portion that eases stress in a direction such that the surface portion 32 of the bezel 31 is separated from the liquid crystal panel 2.

The other bendable portions 42 of the bezel 31 are constructed in the same manner as aforesaid.

In assembling the liquid crystal display device 1 with the construction described above, the liquid crystal panel 2 and the backlight 11 are first attached to the frame 15, as shown in FIGS. 4 and 5. In this state, the bezel 31 is mounted on the obverse side of the frame 15. In doing this, each bendable portion body 43 of the bezel 31 is bent outward around the hinge 45, and the reverse portion 44 is previously situated outside the side face portion 34 of the bezel. By doing this, the bezel 31 can be located in a predetermined position with respect to the frame 15 without allowing the reverse portion 44 to interfere with the frame 15. The surface portion 32 of the bezel 31 covers the peripheral edge portion of the first main surface of the liquid crystal panel 2, while the side face portion 34 covers the respective side faces of the liquid crystal panel 2 and the frame 15.

Figure 7:
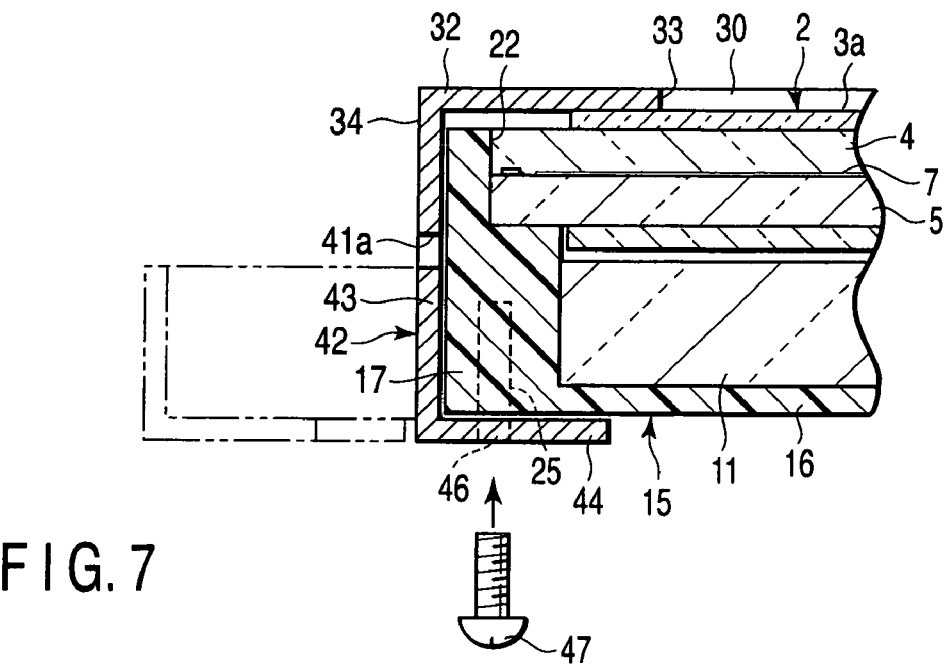
FIG. 7 is a cross-sectional view showing a part of the liquid crystal display device.

Subsequently, each bendable portion body 43 is pushed in toward the frame 15 and pushed back so that it is substantially parallel to the side face portion 34 of the bezel 31, as shown in FIG. 3 and FIGS. 6 and 7. Then, the screw 47 is screwed into the tapped hole 25 of the frame 15 through the through hole 46 of the reverse portion 44, whereby the reverse portion 44 is fixed to the reverse side of the frame body 17. By doing this, the bezel 31 is fixed to the frame 15.

According to the liquid crystal display device constructed in this manner, the bendable portion 42 of the bezel 31 is provided integrally with the reverse portion 44 that is formed having the fixed portion, and can be bent in a direction to cross the sidewall of the bezel, that is, in a direction parallel to the surface portion 32. The reverse portion 44 is fixed to the reverse side of the frame 15 with the bendable portion body 43 pushed back to be parallel to the side face portion 34 of the bezel 31. In this case, a restoring force or reaction force that is attributable to the stiffness of the bendable portion body 43 acts on the bezel 31 in a direction to cross the side face portion 34, that is, in a direction parallel to the surface of the surface portion 32, and cannot easily acts in a direction perpendicular to the surface of the surface portion 32. Thus, the external accuracy of the whole liquid crystal display device 1 can be improved without regard to the bending accuracy of the bendable portion body 43.

At the same time, no reaction force acts on the reverse portion 44 in a screwing direction or a direction perpendicular to the surface of the surface portion 32. Therefore, the surface portion 32 can be prevented from lifting from the first main surface 3a of the liquid crystal panel 2. In the bezel 31, moreover, the slit 41a is formed near the shortest path C that connects the end side 33 and the through hole 46 of the reverse portion 44 that serves as the fixed portion. Thus, the slit 41a eases stress in a direction such that the surface portion 32 of the bezel 31 is separated from the liquid crystal panel 2.

Accordingly, a gap can be prevented from being formed between the liquid crystal panel 2 and the surface portion 32 of the bezel 31, so that light leakage from the backlight 11 can be restrained to improve display quality.

Further, the bendable portion body 43 of each bendable portion 42 is expected only to be bent outward by a margin equivalent to the dimension of projection of the reverse portion 44 from the side face portion 34 of the bezel 31, and its bending angle can be made smaller than that of a conventional bendable portion. Therefore, the bendable portion body 43 can be easily bent, and the hinge 45 need not be provided with any hole or the like that facilitates bending. Thus, the strength of the reverse portion 44 can be enhanced, and the manufacturability of the liquid crystal display device 1 can be improved. Since the reverse portion 44 extends at right angles to the bendable portion body 43, the backlight 11, frame 15, etc. can be enhanced in strength with respect to the weight direction.

Figure 8:
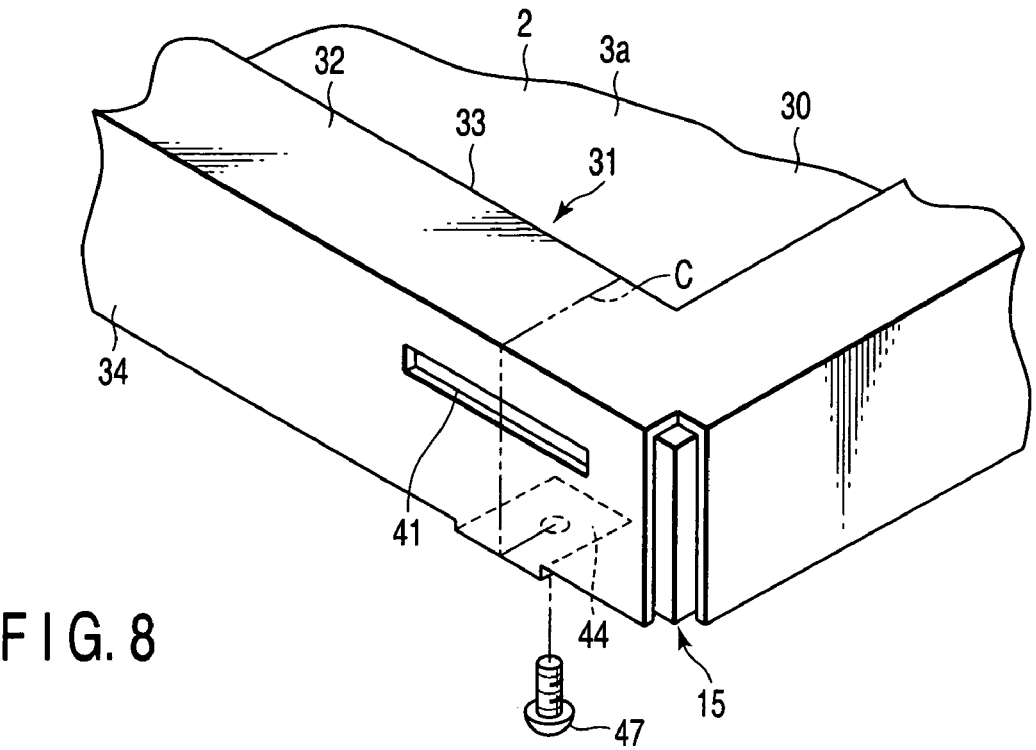
FIG. 8 is a perspective view showing a part of a liquid crystal display device according to a second embodiment of the present invention.
Figure 9:
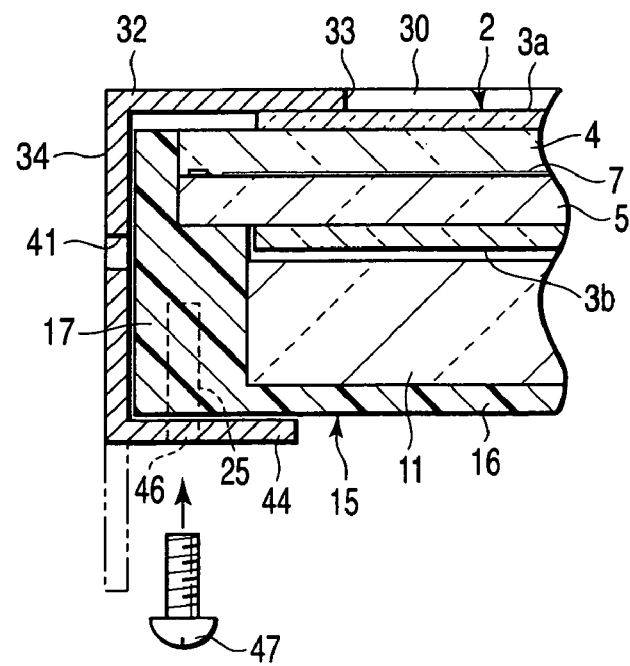
FIG. 9 is a sectional view showing a part of the liquid crystal display device according to the second embodiment.

The following is a description of a liquid crystal display device according to a second embodiment of the present invention. According to the second embodiment, as shown in FIGS. 8 and 9, a bezel 31 is provided with a reverse portion 44 that doubles as a bendable portion. Thus, on each short side of the bezel 31, substantially rectangular reverse portions 44 are provided individually on longitudinally opposite end portions of a side face portion 34. Each reverse portion 44 extends from a side edge of the side face portion 34 and is bent at approximately 90 degrees or at right angles to the side face portion 34. Thus, the reverse portion 44 faces the back of a body 17 of a frame 15.

A through hole 46 is formed substantially in the center of each reverse portion 44. The reverse portion 44 is threadedly fixed to the frame 15 with a screw 47 that is screwed into a tapped hole 25 of the frame 15 through the through hole 46.

If the shortest path that extends along the outer surface of the bezel 31 from the through hole 46 as the fixed portion to an end side 33 of the bezel 31 is C, as shown in FIG. 6, the bezel 31 is formed having a slit 41 that is situated near the shortest path C. In the present embodiment, the slit 41 is formed in the side face portion 34 and extends in the longitudinal direction of the side face portion so as to cross the shortest path C. The slit 41 functions as a stress easing portion that eases stress in a direction such that a surface portion 32 of the bezel 31 is separated from a liquid crystal panel 2.

Other configurations of the second embodiment are the same as those of the foregoing first embodiment, so that like reference numerals are used to designate like portions, and a detailed description of those portions is omitted.

Also in the second embodiment, the slit 41 can ease stress in a direction such that the surface portion 32 of the bezel 31 is separated from the liquid crystal panel 2. Accordingly, a gap can be prevented from being formed between the liquid crystal panel 2 and the surface portion 32 of the bezel 31, so that light leakage can be restrained to ensure the liquid crystal display device with improved display quality.

Figure 10:
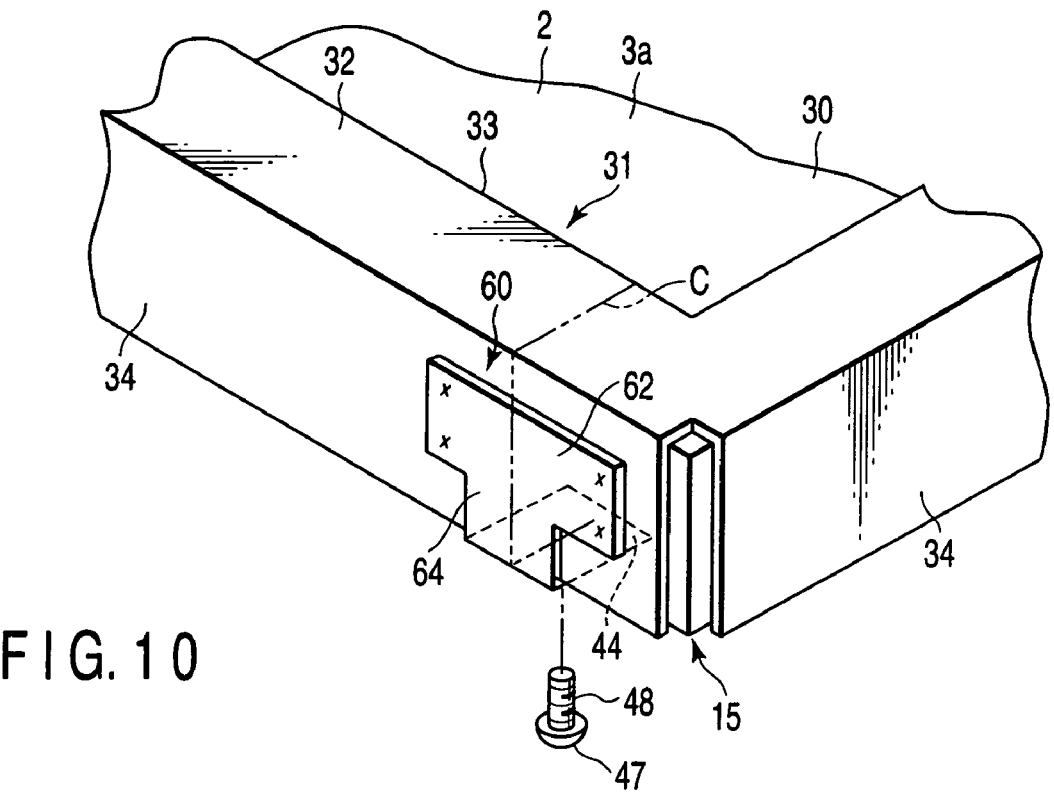
FIG. 10 is a perspective view showing a part of a liquid crystal display device according to a third embodiment of the present invention.
Figure 11:
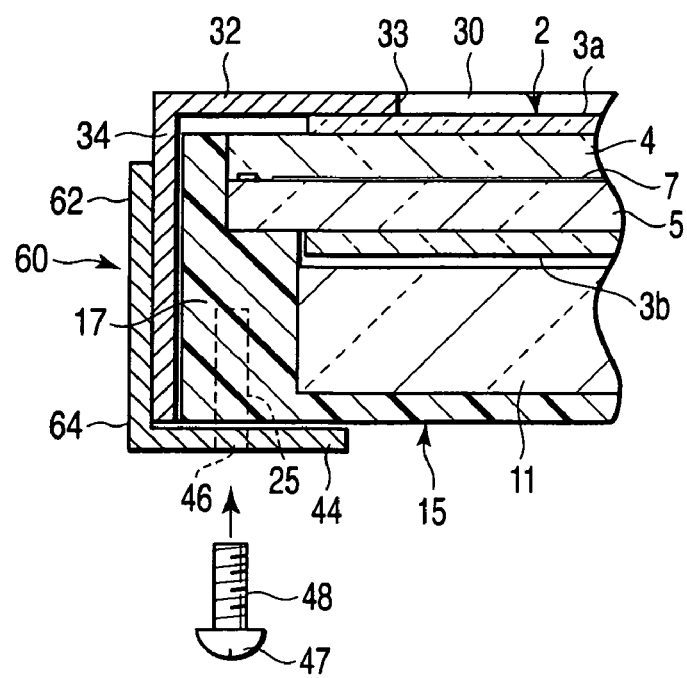
FIG. 11 is a sectional view showing a part of the liquid crystal display device according to the third embodiment.

The following is a description of a liquid crystal display device according to a third embodiment of the present invention. According to the third embodiment, as shown in FIGS. 10 and 11, a reverse portion 44 having a fixed portion is formed of a different member and fixed to a bezel 31.

Thus, on each short side of the bezel 31, plate members 60 each formed of metal are fixed individually on longitudinally opposite end portions of a side face portion 34. The plate member 60 is provided integrally with a rectangular support portion 62 and a rectangular extending portion 64 that extends from the support portion. The support portion 62 is located opposite to the outer surface of the side face portion 34 and extends along the longitudinal direction of the side face portion 34. Longitudinally opposite end portions of the support portion 62 are fixed to the side face portion 34 by welding, for example.

The extending portion 64 extends beyond a side edge of the side face portion 34 from the support portion 62. An extending end portion of the extending portion 64 is bent substantially at right angles toward a frame 15 and constitutes the reverse portion 44 that faces the back of a body 17 of the frame 15. A through hole 46 is formed substantially in the center of each reverse portion 44. The reverse portion 44 is threadedly fixed to the frame 15 with a screw 47 that is screwed into a tapped hole 25 of the frame 15 through the through hole 46.

If the shortest path that extends along the outer surface of the bezel 31 from the through hole 46 as the fixed portion to an end side 33 of the bezel 31 is C, the support portion 62 of the plate member 60 extends across the shortest path C and fixed to the side face portion 34 on the opposite sides of the shortest path C. Only the opposite end portions of the support portion 62 are fixed, and other portions thereof are not fixed to the side face portion 34. Thus, the central portion of the support portion 62 is relatively elastically deformable with respect to the side face portion 34 and is situated on the shortest path C. The support portion 62 functions as a stress easing portion that eases stress in a direction such that a surface portion 32 of the bezel 31 is separated from a liquid crystal panel 2.

Other configurations of the third embodiment are the same as those of the foregoing first embodiment, so that like reference numerals are used to designate like portions, and a detailed description of those portions is omitted.

Also in the third embodiment, stress in a direction such that the surface portion 32 of the bezel 31 is separated from the liquid crystal panel 2 can be eased as the plate member 60, which is attached to the bezel 31 in the vicinity of the shortest path C, is elastically deformed. Accordingly, a gap can be prevented from being formed between the liquid crystal panel 2 and the surface portion 32 of the bezel 31, so that light leakage can be restrained to ensure the liquid crystal display device with improved display quality.

Figure 12:
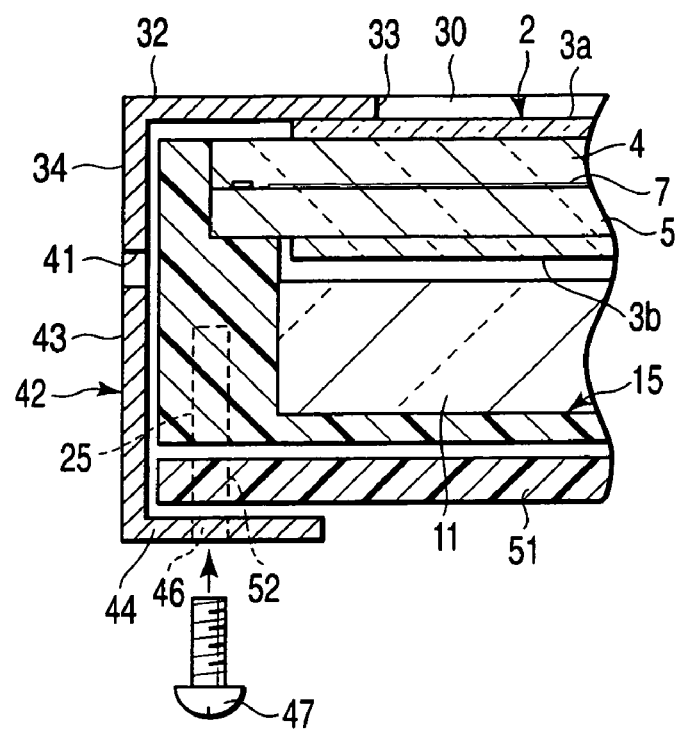
FIG. 12 is a sectional view showing a part of a liquid crystal display device according to a fourth embodiment of the present invention.

The following is a description of a liquid crystal display device according to a fourth embodiment of the present invention. According to the fourth embodiment, as shown in FIG. 12, a substantially rectangular circuit board 51 is located on the reverse side of a frame 15. The circuit board 51 is connected electrically to a liquid crystal panel 2 and supplies drive signals, such as electrical signals or electrical energy, to the liquid crystal panel 2. The circuit board 51 is formed having a rectangular shape substantially equal to that of the reverse side of the frame 15. Those parts of the circuit board 51 near its four corners are penetrated individually by through holes 52 that are situated corresponding to tapped holes 25 of the frame 15. The holes 52 are aligned with the tapped holes 25, individually.

Each of reverse portions 44 of a bezel 31 is opposed to the back of circuit board 51 and is situated on the opposite side of the circuit board 51 from the frame 15. Thus, the reverse portion 44 is situated at the extreme backside. A through hole 46 that is formed in the reverse portion 44 is situated in alignment with its corresponding one of through holes 55 of the circuit board 51 and its corresponding tapped hole 25 of the frame 15.

In assembly, the bezel 31 is mounted on the obverse side of the frame 15 after the liquid crystal panel 2 and a backlight 11 are attached to the frame 15. Further, the circuit board 51 is located on the reverse side of the frame 15. Subsequently, a bendable portion body 43 of the bezel 31 is pushed in along the surface direction of a surface portion 32 so that it is substantially parallel to a side face portion 34 of the bezel 31. In this state, a screw 47 is screwed into the tapped hole 25 of the frame 15 through the through hole 46 of the reverse portion 44 and the through hole 55 of the circuit board 51.

In consequence, the bezel 31, frame 15, and circuit board 51 are fixed to one another, and the bezel 31 and the circuit board 51 are connected electrically to each other through the screw 47.

Other configurations of the fourth embodiment are the same as those of the foregoing first embodiment, so that like reference numerals are used to designate like portions, and a detailed description of those portions is omitted.

Functions and effects similar to those of the first embodiment can be obtained according to the fourth embodiment arranged in this manner. When the reverse portion 44 of the bezel 31 and the frame 15 are fixed together by the screw 47, moreover, the bezel 31 and the circuit board 51 are connected electrically to each other through the screw 47. In electrically connecting, for example, the circuit board 51 to an external circuit or the like, therefore, wire arrangement can be started at any desired position on the bezel 31. Accordingly, the space can be saved, or the wire arrangement can be facilitated. In consequence, the manufacturability of the liquid crystal display device can be further improved.

Figure 13:
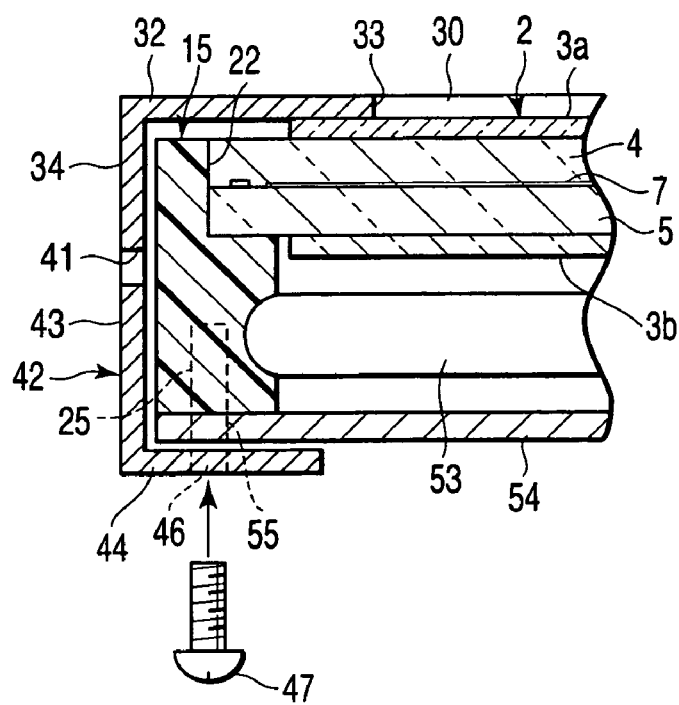
FIG. 13 is a perspective view showing a part of a liquid crystal display device according to a fifth embodiment of the present invention.

The following is a description of a liquid crystal display device according to a fifth embodiment of the present invention. According to the fifth embodiment, as shown in FIG. 13, a frame 15 is fitted with a discharge lamp 53 as a light source, in place of the surface light source 24. The discharge lamp 53 is in the form of an elongated rod, which has a longitudinal dimension a little greater than the transverse dimension of a bottom portion of the frame 15. The discharge lamp 53 is supported by the frame 15 and opposed to a second main surface 3b of a liquid crystal panel 2. A light beam is emitted from the discharge lamp 53 for irradiation in a direction perpendicular to the liquid crystal panel 2.

A bottom wall 16 of the frame 15 is formed of a metal plate 54 that serves as an electrically conductive metal member. The metal plate 54 faces the discharge lamp 53 and closes the reverse side of the frame 15. The metal plate 54 reflects on the liquid crystal panel 2 a light beam emitted from the discharge lamp 53 for downward irradiation.

Each of reverse portions 44 of a bezel 31 is opposed to that side of the metal plate 54 opposite from the discharge lamp 53, that is, to the back of the metal plate. A through hole 46 corresponding to each tapped hole 25 of the frame 15 is formed near each of the four corners of the metal plate 54 and aligned with the tapped hole 25.

In assembly, the bezel 31 is mounted on the obverse side of the frame 15 after the liquid crystal panel 2 and the discharge lamp 53 are attached to the frame 15. Further, the metal plate 54 is located on the reverse side of the frame 15. Subsequently, a bendable portion body 43 of the bezel 31 is pushed in along the surface direction of a surface portion 32 so that it is substantially parallel to a side face portion 34 of the bezel 31. In this state, a screw 47 is screwed into the tapped hole 25 of the frame 15 through the through hole 46 of the reverse portion 44 and a through hole 55 of the metal plate 54.

In consequence, the bezel 31, frame 15, and metal plate 54 are fixed to one another, and the bezel 31 and the metal plate 54 are connected electrically to each other through the screw 47.

Other configurations of the fifth embodiment are the same as those of the foregoing first embodiment, so that like reference numerals are used to designate like portions, and a detailed description of those portions is omitted.

Functions and effects similar to those of the first embodiment can be obtained according to the fifth embodiment arranged in this manner. When the reverse portion 44 of the bezel 31 and the frame 15 are fixed together by the screw 47, moreover, the bezel 31 and the metal plate 54 are connected electrically to each other through the screw 47. Therefore, wire arrangement can be ensured such that the bezel 31 is connected electrically to the metal plate 54 utilizing any desired position. Accordingly, the space can be saved, or the wire arrangement can be facilitated. In consequence, the manufacturability of the liquid crystal display device can be further improved.

This invention is not limited to the embodiments described above, and various modifications may be effected therein without departing from the scope of the invention. In connection with each of the foregoing embodiments, for example, the liquid crystal display device has been described as being capable of displaying video images by means of the liquid crystal panel 2. However, this invention may be also applied to a flat display device that uses any other flat display panel than the liquid crystal panel 2, e.g., an EL display device that uses electroluminescence (EL) elements.

The liquid crystal display device described herein is of a transparent or semitransparent type in which a light beam from the backlight 11 is transmitted through the reverse side of the liquid crystal panel 2. Alternatively, in each embodiment, however, a front light having a prism on the top surface of the light guide 14 may be used as the surface light source. In this case, the front light may be located on the first main surface side of the liquid crystal panel 2 so that the liquid crystal display device is of a reflection type in which a light beam is reflected on the surface of the liquid crystal panel 2 by the front light. Functions and effects similar to those of the foregoing embodiments can be also obtained with this arrangement.

What is claimed is:

1. A flat display device comprising:
   a flat display panel provided with a first main surface having a display region in which an image is displayed and a second main surface opposed to the first main surface;
   a frame which is located on the second main surface side of the flat display panel and holds the flat display panel; and
   a frame-shaped bezel fixed to the frame and holds the flat display panel between the frame and the bezel,
   the bezel including
   a surface portion which has an end side on the boundary with the display region of the flat display panel and covers the first main surface of the flat display panel with the display region exposed,
   a side face portion which covers at least a part of a side face of the frame,
   a reverse portion which extends covering at least a part of a reverse surface of the frame,
   a fixed portion provided on the reverse portion of the bezel and fixed to the frame by a screw, and
   a stress easing portion including a slit which is formed in the side face portion and extends parallel to the end side across a shortest path directly extending from the screw toward the end side on the bezel and eases stress which is generated in screwing the screw in a direction which would otherwise tend to separate the surface portion and the flat display panel from each other.

2. The flat display device according to claim 1, wherein the bezel has a bendable portion provided on the side face portion so as to be bendable along the surface direction of the surface portion, and the reverse portion extends from the bendable portion and faces the reverse surface of the frame.

3. The flat display device according to claim 1, wherein the side face portion has a side edge situated on the side opposite from the surface portion, and the reverse portion extends from the side edge of the side face portion and faces the reverse surface of the frame.

4. The flat display device according to claim 1, which comprises a circuit board which is connected electrically to the flat display panel and supplies drive signals to the flat display panel, and wherein the fixed portion of the bezel is fixed to the frame by an electrically conductive screw, and the bezel is electrically conductive and connected electrically to the circuit board through the screw.

5. The flat display device according to claim 4, wherein the circuit board is fixed together with the fixed portion to the frame by the screw.

* * * * *